ROOF TRUSS FORMING MACHINE

Original Filed Feb. 10, 1969 5 Sheets-Sheet 1

INVENTOR
DONALD P. POST by: Wallenstein, Spangenberg, Hattis & Strampel ATTYS.

ROOF TRUSS FORMING MACHINE

Original Filed Feb. 10, 1969 5 Sheets-Sheet 2

INVENTOR
DONALD P. POST by: Wallenstein, Spangenberg, Hattis & Strampel ATTYS.

ROOF TRUSS FORMING MACHINE

Original Filed Feb. 10, 1969 5 Sheets-Sheet 3

INVENTOR
DONALD P. POST by: Wallenstein, Spangenberg, Hattis & Strampel ATTYS.

ROOF TRUSS FORMING MACHINE

Original Filed Feb. 10, 1969 5 Sheets-Sheet 4

INVENTOR
DONALD P. POST by: Wallenstein, Spangenberg, Hattis & Strampel ATTYS.

ROOF TRUSS FORMING MACHINE

Original Filed Feb. 10, 1969 5 Sheets-Sheet 5

INVENTOR
DONALD P. POST by: Wallenstein, Spangenberg, Hattis & Strampel ATTYS.

United States Patent Office

Re. 27,692
Reissued July 3, 1973

27,692
ROOF TRUSS FORMING MACHINE

Donald P. Post, Palatine, Ill., assignor to
Structomatic, Inc., Chicago, Ill.

Original No. 3,530,790, dated Sept. 29, 1970, Ser. No. 798,031, Feb. 10, 1969. Application for reissue Dec. 29, 1971, Ser. No. 213,758
Int. Cl. B30b *1/18*
U.S. Cl. 100—100 14 Claims

Matter enclosed in heavy brackets [ ] appears in the original patent but forms no part of this reissue specification; matter printed in italics indicates the additions made by reissue.

ABSTRACT OF THE DISCLOSURE

A roof truss forming machine for assembling and nailing with nail plates timbers into a planar roof truss includes a stationary elongated rail and a plurality of bridges extending laterally therefrom and adjustably positioned along the rail. Each bridge longitudinally adjustably carries at least one base and each base rotatably adjustably carries a stand which supports the timbers to be nailed. Each stand movably carries a cradle which is movable toward and away from the timbers to be nailed, and each cradle supports a hydraulically operated C-clamp for pressing the nail plates into the timbers supported by the stand when the cradle is moved toward the timbers.

A principal object of this invention is to provide an improved roof truss forming machine which is substantially completely adjustable so that planar roof trusses of substantially any size and configuration may be readily assembled from timbers and nailed with nail plates, such as, for example, king post, hip, shed, girder, monopitch, fink scissors, flat, cambered or the like trusses, it even being possible to assemble and nail a circular truss if this should be desired, which is inexpensive to manufacture and assemble; which is simple in construction and simple to assemble and adjust; which can assemble and nail trusses in a minimal time period with minimal manpower and expense; and which can simultaneously press nail plates into the opposite sides of the timbers of the roof truss with simple hydraulically operated C-clamps which are adjustably positioned to face the work and which can be readily moved toward and away from the work to facilitate placement of the timbers and removed of the nailed truss.

Briefly, the roof truss forming machine of this invention for assembling timbers and nailing them with nail plates into a planar roof truss includes a stationary elongated rail and a plurality of bridges extending laterally therefrom and adjustably positioned along the rail. Each bridge longitudinally adjustably carries at least one base and each base rotatably adjustably carries a stand which supports the timbers to be nailed. By this completely adjustable structure the stands may be adjustably positioned in any desired lateral positions and may be adjustably rotatably positioned to always face the timbers so that trusses of substantially any size and configuration may be readily and accurately assembled.

Each stand movably carries a cradle which is movable toward and away from the timbers to be nailed and each cradle supports a hydraulically operated C-clamp for pressing the nail plates into the timbers supported by the stand when the cradle is moved toward the timbers. When the cradles and the C-clamps carried thereby are moved away from the timbers the nailed truss may be readily removed from the stands and new timbers may be readily assembled on the stands without interference from the C-clamps. This allows for assembling and nailing of trusses in a minimal of time with minimal manpower and expense. The hydraulically operated C-clamps and their mounting on the cradles are such as to provide for the simultaneous pressing of nail plates into both sides of the timbers in a simple and effective manner.

Other objects of this invention reside in the details of construction of the roof truss forming machine and the component parts thereof and in the cooperative relationship between the component parts of the machine.

Further objects and advantages of this invention will become apparent to those skilled in the art upon reference to the accompanying specification, claims and drawings in which:

Figure 1:
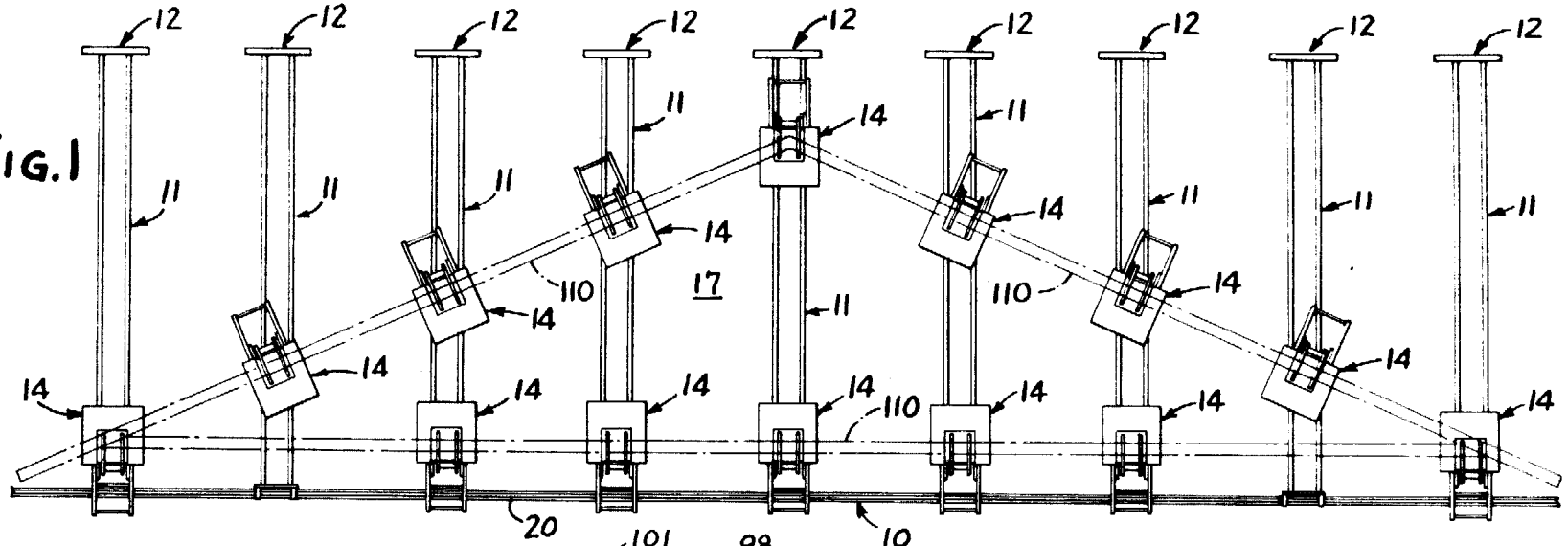
FIG. 1 is a top plan view of the roof truss forming machine of this invention.
Figure 6:
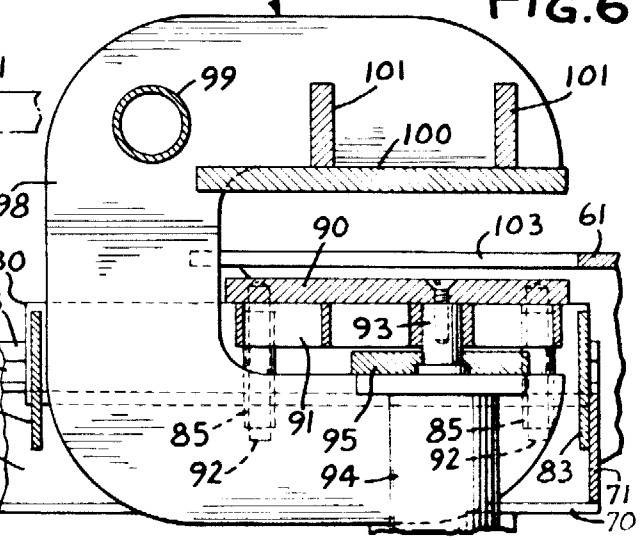
FIG. 6 is a sectional view through the upper portion of the machine illustrated in FIG. 2 and taken substantially along the line 6—6 of FIG. 4.
Figure 7:
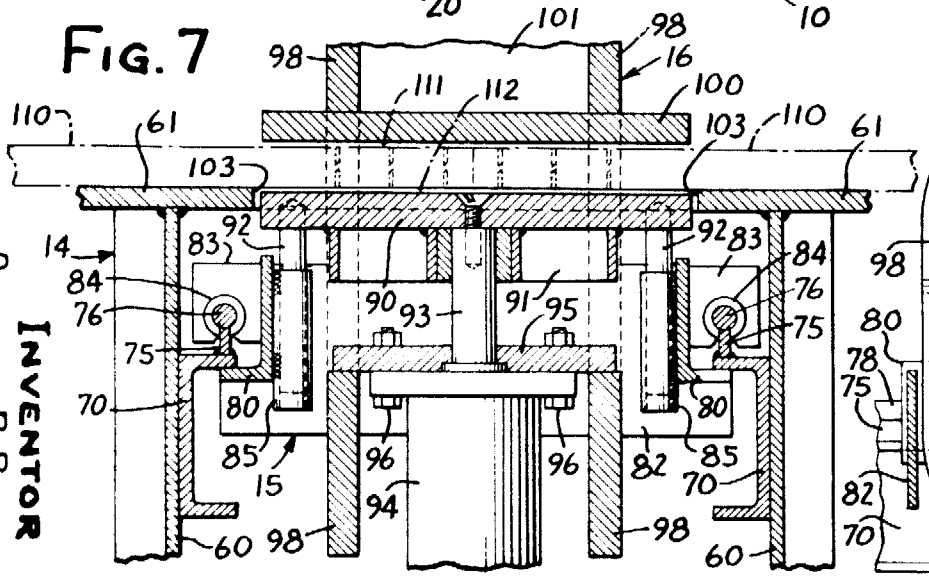
FIG. 7 is a sectional view taken substantially along the line 7—7 of FIG. 4 but showing the C-clamp closed.
Figure 2:
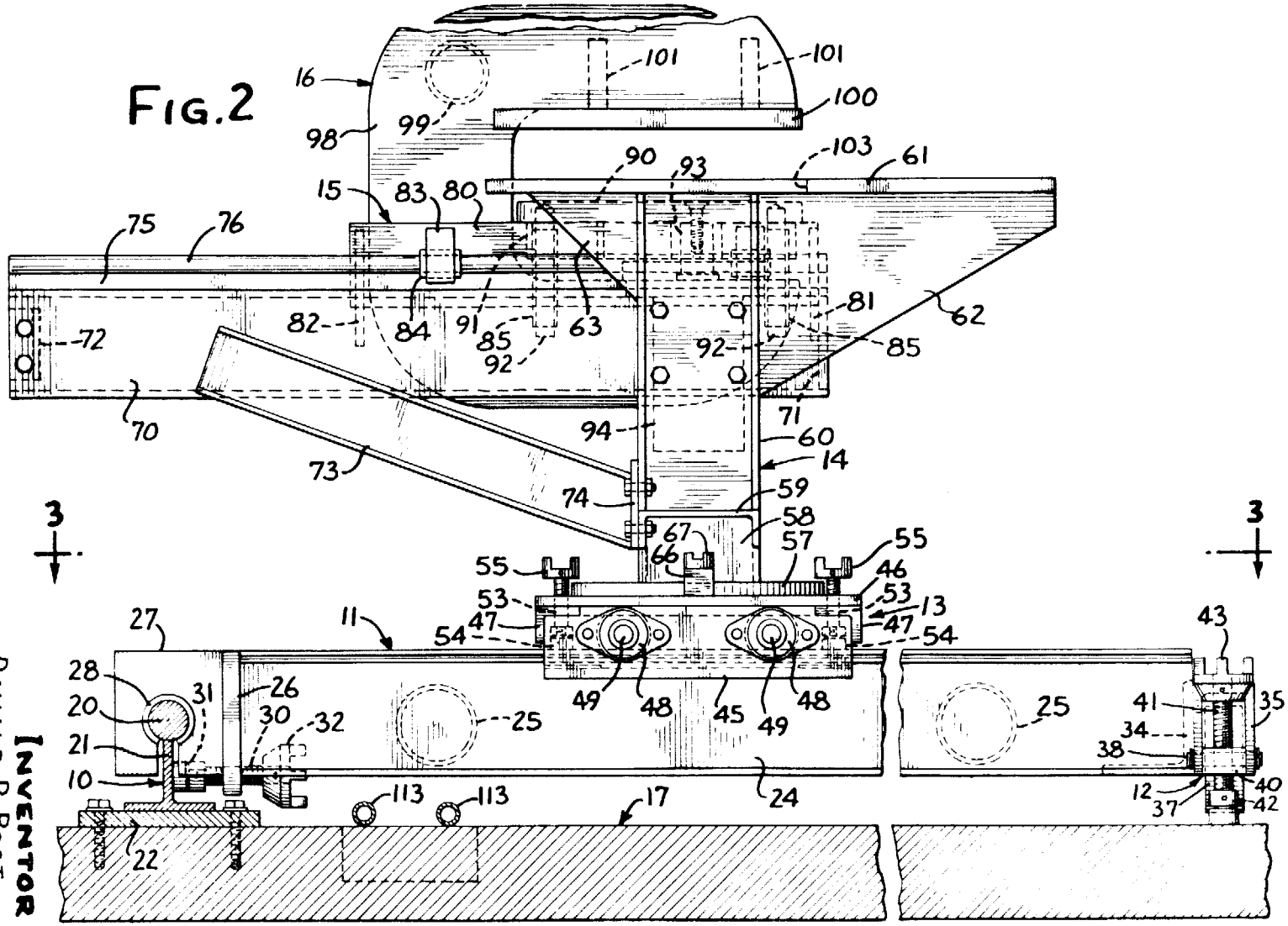
FIG. 2 is an enlarged side elevational view of a portion of the machine looking from the right of FIG. 1.

Referring first to FIGS. 1 and 2, the roof truss forming machine of this invention for assembling timbers and nailing them with nail plates into a planar roof truss includes a substantially elongated rail generally designated at 10 and a plurality of bridges generally designated at 11 extending laterally from the rail 10 and being adjustably positioned along the rail 10. Any desired number of bridges 11 may be utilized, nine being illustrated by way of example. The bridges 11 may be of the same length as illustrated in FIG. 1 or the bridges may decrease in length from the center bridge outwardly if this should be desired. The bridges 11 are movably mounted at one end on the rail 10 so as to be adjustably positionable therealong and the other free end of the bridges are provided with carriages generally designated at 12. These carriages support the free ends of the bridges 11. Each bridge 11 longitudinally adjustably carries at least one base generally designated at 13 and each base 13 rotatably adjustably carries a stand generally designated at 14 which supports the timbers to be nailed. Each stand movably carries a cradle generally desigated at 15 which is movable toward and away from the timbers to be nailed and each cradle supports a hydraulically operated C-clamp generally designated at 16 for pressing the nail plates into the timbers supported by the stand 14 when the cradle 15 is moved toward the timbers. The cradles 15 and C-clamps 16 are illustrated in the advanced position in the drawings where they have been moved toward the timbers to be nailed. The roof truss forming machine is supported by the floor generally designated at 17, the stationary elongated rail 10 being secured to the floor and the carriages 12 being rollable along and supported by the floor when the bridge members 11 are moved along the stationary rail 10.

In FIG. 1 the stands 14 of the roof truss are shown to be positioned for fabricating a girder truss, the top and bottom timbers of the truss being shown in broken lines at 110. For clarity, the bracing members of the girder truss between the timbers 110 have not been illustrated.

Figures 3, 8, 9, 10:
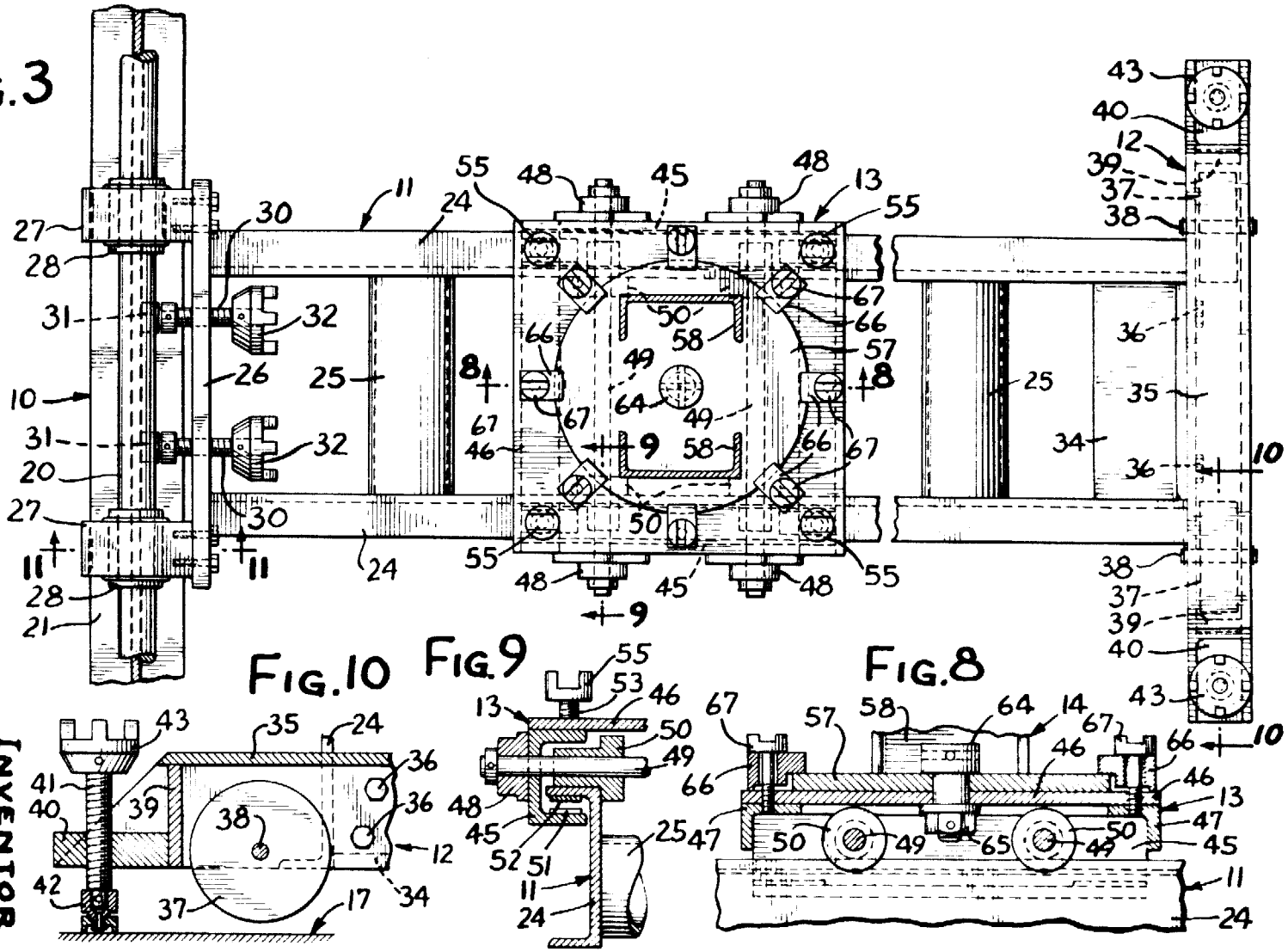
FIG. 3 is a top plan view of the lower portion of the machine illustrated in FIG. 2, the view being taken substantially along the line 3—3 of FIG. 2.
FIG. 8 is a sectional view taken substantially along the line 8—8 of FIG. 3.
FIG. 9 is a sectional view taken substantially along the line 9—9 of FIG. 3.
FIG. 10 is a sectional view taken substantially along the line 10—10 of FIG. 3.
Figure 4:
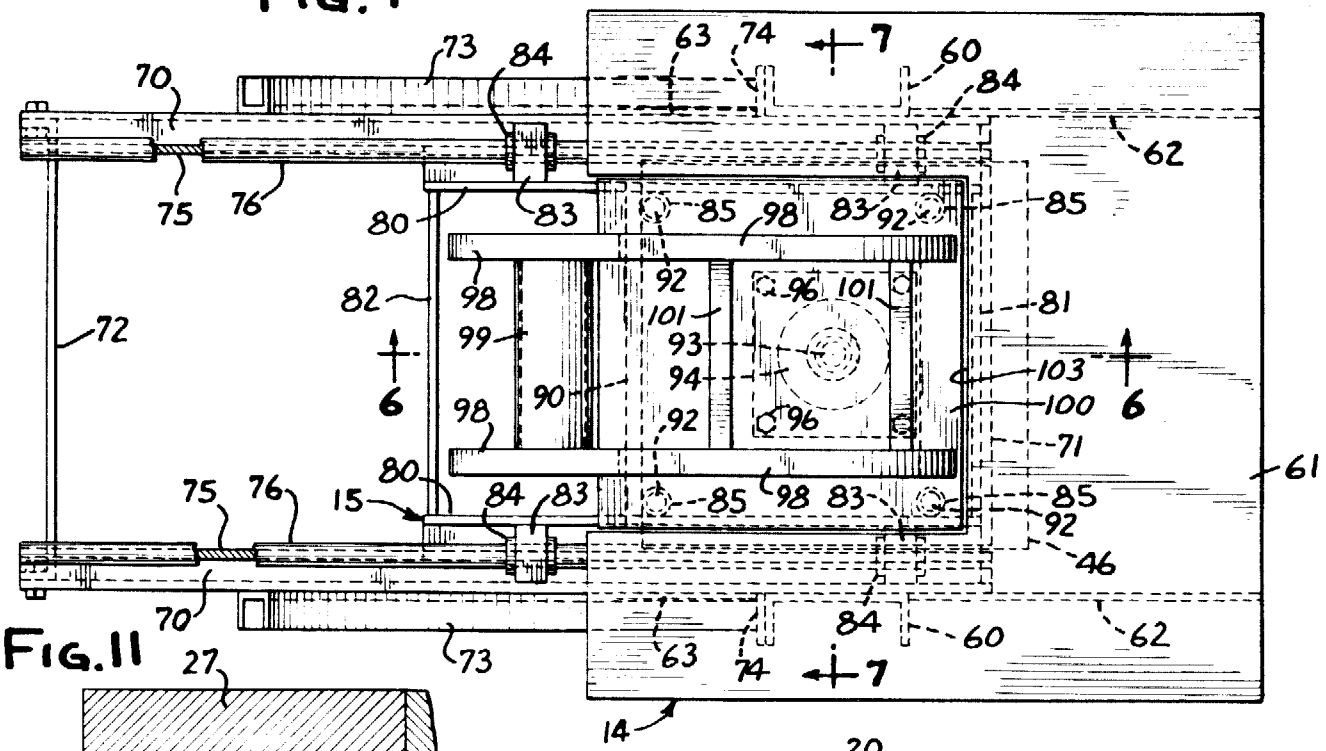
FIG. 4 is a top plan view of the portion of the machine illustrated in FIG. 2.

As shown more clearly in FIGS. 2 and 3, the stationary elongated rail 10 includes a round bar 20 which is welded to an inverted T-bar 21 which in turn is secured to pads 22 which are fastened to the floor 17. Care is taken in mounting the rail 10 to make sure that the rod 20 is straight and level. The rod 20 and T-bars 21 may extend the length of the machine or they may be made in sections lengthwise of the machine and aligned by suitable dowels etxending into the ends of the rod sections 20.

Figure 12:
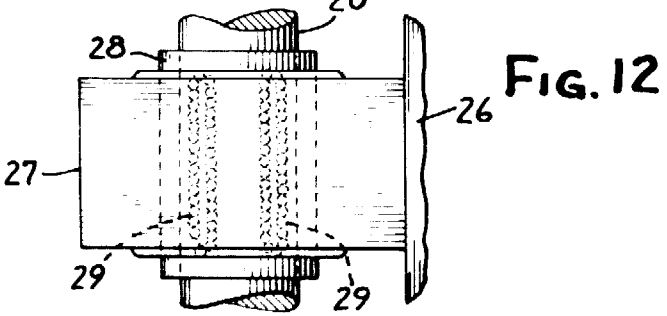
FIG. 12 is a top elevational view of the structure illustrated in FIG. 11.
Figure 11:
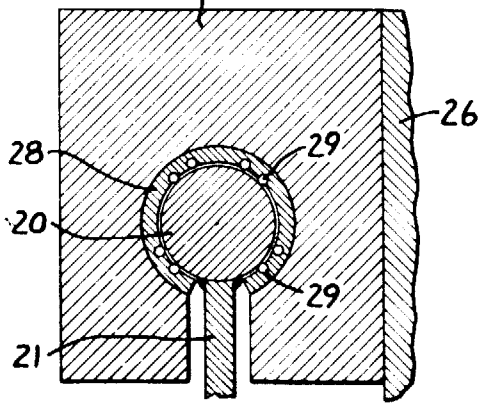
FIG. 11 is a diagrammatic sectional view taken substantially along the line 11—11 of FIG. 3.

Each bridge 11 includes a pair of outwardly facing channels 24 which are welded together by tubes 25 welded therebetween. A plate 26 is welded to the channels 24 and this plate carries a pair of brackets 27 provided with circular bores therethrough and a downwardly communicating slot. The brackets 27 carry split anti-friction bushings which are diagrammatically illustrated in more detail in FIGS. 11 and 12. These bushings include longitudinally extending and communicating grooves which contain a plurality of balls 29. The brackets 27 of the bridges 11 are received over the rods 20 carried by the T-bar 21, the brackets 27 having slots and the anti-friction bushing being being split to accommodate the T-bar. As the brackets 27 and the birdges 11 carrying the same are moved longitudinally along the rod 20, the balls 29 roll on the rod 20 in the grooves in the bushings 28 so as to provide anti-friction movement of the bridges 11 with respect to the stationary rail 10. As a result, the bridges 11 may be moved along the rail 10 in an extremely easy fashion. The plate 26 of each bridge member carries a pair of pressure screws 30 which are screw threadedly mounted in the plate 26. The screws 30 carry universally mounted pressure pads 31 which are adapted to engage and disengage the T-bar of the rail, the screws 30 being operated towards this end by knobs 32. Thus, as the bridge 11 is moved to a desired poistion along the rail 10, the pressure screws 30 may then be tightened to clamp the bridge 11 to the rail 10 at the desired selected position.

The other free end of each bridge 11 has an angle iron 34 welded between the channels 24 and the carriage generally designated at 12 is suitably secured to this angle iron 34 as by bolts 36 or the like. As shown more clearly in FIGS. 2, 3 and 5, the carriage generally designated at 12 is channel shaped in configuration including an angle iron 35 and a plate welded thereto. A pair of wheels 37 are rotatably mounted in the channel shaped carriage 12 by pins 38. The wheels 37 can engage the floor 17 so as to rollingly support the outer free end of the bridge 11 as it is adjustably positioned along the rail 10. The channel has welded thereto a pair of plates 39 and a pair of plates 40 are welded to the channel shaped carriage and the plates 39. A pair of pressure screws 41 are threaded into the plates 40 and they are provided at their lower ends with pressure pads 42, the pressure screws 41 being rotated by knobs 43. When the bridge 11 is moved to its desired position, the pressure screws 41 are operated to cause the pressure pads 42 to engage the floor 17 and lift the carriage 12 and, hence, the wheels 37 from the floor 17. In this way, the carriage and the free end of the bridge 11 are secured in proper adjusted position.

As shown more clearly in FIGS. 2, 3, 5, 8 and 9, the base 13 includes a pair of inwardly facing channels 45 which are welded to a plate 46 which provides an upwardly facing planar surface. A pair of angle irons 47 are also welded to the plate 46 between the channels 45. As will be noted, the lower portions of the channels 45 of the base 13 underlie the upper portions of the channels 24 of the bridge 11. Bearings 48 are secured to the channels 45 of the base 13 and support a pair of shafts 49 which in turn carry rollers 50 which ride upon and are guided by the channels 24 of the bridge 11. Thus, the carriage is longitudinally movable along the bridge 11 by means of the rollers 50. The upper surfaces of the lower portions of the channels 45 are provided with friction strips 51 and the lower surfaces of the upper portions of the channels 24 are provided with friction strips 52. Pressure screws 53 are threaded into the plate 46 and channels 45 and they are provided at their lower ends with pressure pads 54, the pressure screws 53 being rotated by knobs 55. When the base 13 is moved to the desired adjusted position on the bridge 11 as described above, the pressure screws 53 are then manipulated to cause the pads 54 carried thereby to engage the upper surface of the channels 24 of the bridge. This moves the rollers 50 upwardly off of the channels 24 and causes the friction strips 51 and 52 to engage for locking the base 13 in desired position on the bridge 11.

The stand generally designated at 14 includes a circular plate 57 having a lower planar surface which engages the upper planar surface of the plate 46 of the base 13. A pair of channels 58 are welded to the circular plate 57 and also channels 59 are welded to the channels 58. Channels 60 which are welded to the channels 59 extend upwardly and carry at their upper ends a plate 61 which is welded thereto and which is adapted to support the timbers to be nailed by the nailing machine. Support plates 62 and 63 are welded to the channels 60 and the plate 61 for reinforcing the latter. The plate 57 of the frame 14 and the plate 46 of the base 13 are each provided with a central hole for receiving a bolt 64 and nut 65 for rotatably mounting the plate 57 and, hence, the stand 14 on the plate 46 of the base 13, this rotatable mounting providing for 360° rotation of the frame 14 with respect to the base 13. Provided around the circumference of the circular plate 57 are a plurality of clamp blocks 66 which are secured in place on the plate 46 of the base 13 by screws 67. When the stand 14 is rotated to the desired rotative position with respect to the base 13, the screws 67 are tightened to cause the blocks 66 to clamp the stand 14 in the proper rotative position with respect to the base 13.

A pair of channels 70 are secured to the channels 60 as by means of bolts or the like. A plate 71 is welded between the forward ends of the channels 70 and a strap 72 is suitably secured between the other ends of the channels 70 as by means of bolts or the like. Bracing members 73 are welded to the channels 70 and are suitably secured, as by a plate and bolts to the channels 59 and 60 of the stand, the bracing members 73 supporting the overhang of the channels 70. A pair of bars 75 are welded to the upper surfaces of the channels 70 and a pair of rods 76 are welded to the bars 75, the rods 76 forming a pair of rails extending along the channels 70.

The cradle generally designated at 15 includes a pair of angles 80 and a forward plate 81 and a rear plate 82 are welded to the angles 80 to form a rigid cradle construction. The angles 80 of the cradle carry two pairs of blocks 83 which in turn carry split anti-friction bushings 84 similar to the ones discussed above. These bushings 84 mount the cradle 15 on the bars 76 so that the cradle 15 may be readily moved between retracted and advanced positions, the drawings illustrating the cradle 15 having been moved toward the timbers to be nailed and, hence, in the advanced position. Two pairs of sleeves 85 are welded to the channels 80, these sleeves operating as vertical guide means for the hydraulically operated C-clamp generally designated at 16.

The hydraulically operated C-clamp 16, as shown more clearly in FIGS. 4, 5, 6 and 7, includes a platen 90 welded to a platen frame 91. The platen 90 and platen frame 91 are secured to piston rod 93 carried by a piston arranged within a hydraulic cylinder 94, the cylinder 94 being secured by bolts and nuts 96 to a plate 95. A pair of C-clamp members 98 are welded to the plate 95 and they are secured together by a tube 99 and plates 101 welded thereto. The upper portion of the thus fabricated C-clamp member has a pressure plate 100 welded thereto, the pressure plate 100 being arranged above the platen 90. The supporting plate 61 which supports the timbers to be nailed is provided with an opening 103 for accommodating the platen 90 when it is moved upwardly during the nail plate pressing operation.

The platen 90 is provided with two pairs of depending pins 92 which are slidably mounted in the sleeves 85 of the cradle 15 for guiding the movement of the C-clamp assembly. When the hydraulic motor including the cylinder 94 and the piston therein is operated to separate the platen 90 from the pressure plate 100, the platen 90 rests against the angles 80 of the cradle, this being caused by the weight of the C-clamp assembly and this position being illustrated in FIG. 5. In performing the nailing operation, the cradle 15 and the hydraulically operated C-clamp are initially in the retracted position and the timbers 110 are assembled on the support plate 61 in proper position to be nailed. The support plate 61 is preferably provided with jig means such as blocks or the like (not shown) removably secured thereto for guiding the timbers in proper position on the support plate. A nail plate 112 is placed on the platen 90 and another nail plate 111 is placed upon the timbers 110 where the timbers are to be nailed together. The cradle 15 and hydraulically operated C-clamp are then advanced to a position where the platen 90 is underneath the timbers and the pressure plate 100 is above the timbers, this movement being permitted because of the wide space between the platen 90 and the pressure plate 100. When the cradle 15 and the C-clamp 16 are thus moved to the nailing position, the hydraulic motor including the cylinder 94 and the piston therein are operated to move the platen 90 and the pressure plate 100 toward each other. At first the pressure plate 100 will usually first engage the nail plate 111 above the timbers 110 and when resistance is met, the platen 90 is raised off of the angles 80 to cause the nail plate 111 carried thereby to engage the undersides of the timbers 110. Thereafter, the platen 90 and the pressure plate 100 will substantially simultaneously move to press simultaneously the nail plates 111 and 112 into the timbers 110 as is illustrated more particularly in FIG. 7. In this way, the nail plates are simultaneously driven into the timbers in a simple manner without the need for extraneous linkages between the platen 90 and the pressure plate 100.

Figure 5:
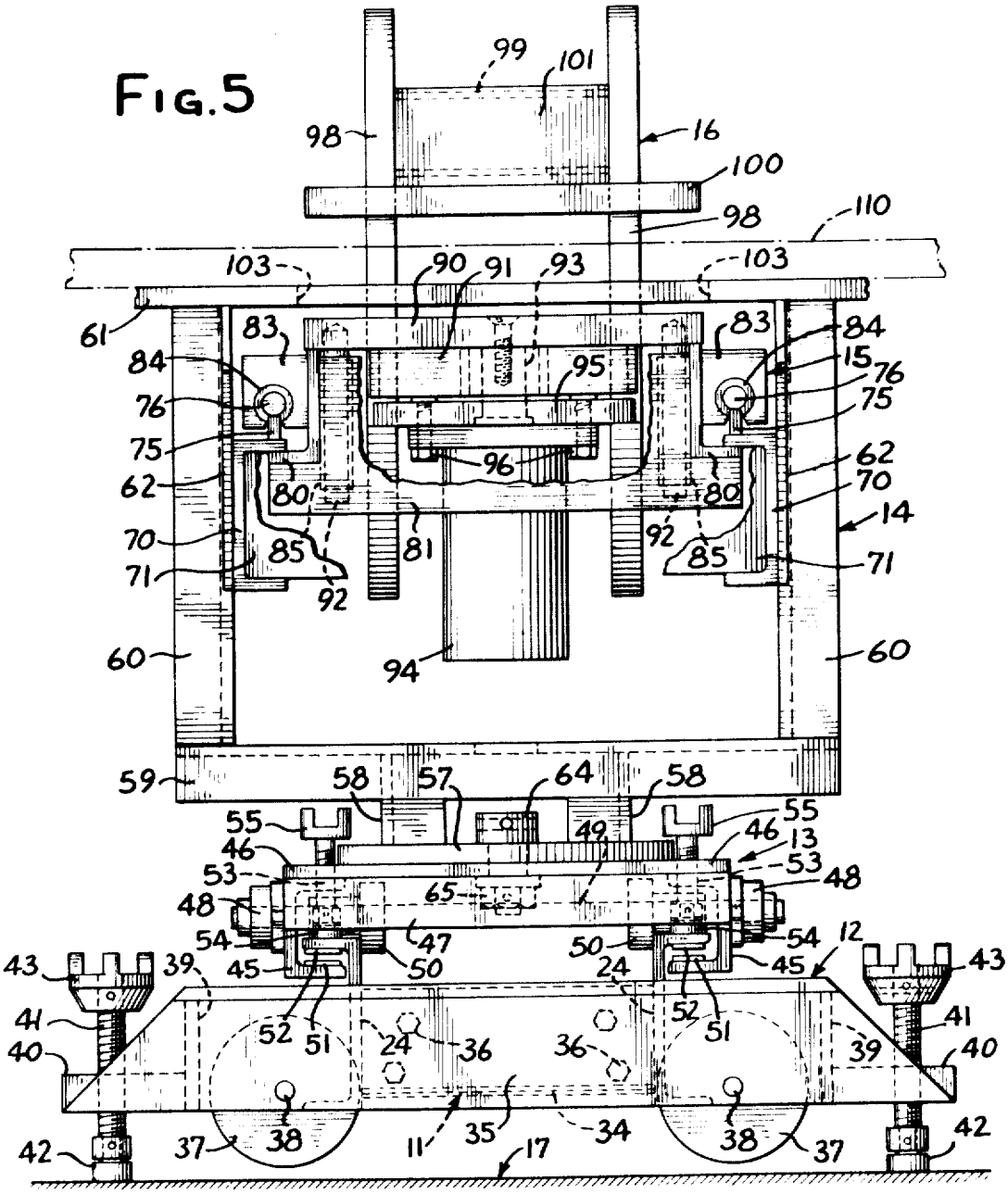
FIG. 5 is an end elevational view of the portion of the machine illustrated in FIG. 2 and looking from the right of FIG. 2.

When the operation of the hydraulic motor is such as to separate the platen 90 from the pressure plate 100, the platen 90 will first recede and engage the angles 80 of the cradle and then the pressure plate 100 will be moved upwardly to the position illustrated in FIG. 5. Each cradle 15 and hydraulically operated C-clamp may then be retracted rearwardly to expose the nailed roof truss so that it may be readily removed from the stands 14 and new timbers readily assembled on the stands for forming another roof truss.

Hydraulic pipes 113 may extend along the floor 17 adjacent the stationary rail 10, as shown in FIG. 2, and may be provided with T's and flexible hose connections to the cylinders 94 of the various C-clamps. By manipulating the hydraulic pressure from a suitable control point, all of the C-clamps 16 may be simultaneously opened and closed to provide simultaneous nailing operations for the entire roof truss. As illustrated in the drawings, the cradle 15 and C-clamps 16 may be readily manually moved toward and away from the timbers supported by the stands 14, the forward motion being limited by the plate 81 of the cradle 15 engaging the plate 71 of the stand and being limited in its rearward movement by the plate 82 of the cradle 15 engaging the strap 72 of the stand 14. This movement may be manually performed or each stand may be provided with a hydraulic motor (not shown) to automatically and simultaneously advance and retract all of the cradles 15 and the C-clamps 16 carried thereby.

While for purposes of illustration one form of this invention has been disclosed, other forms thereof may become apparent to those skilled in the art upon reference to this disclosure and, therefore, this invention is to be limited only by the scope of the appended claims.

I claim:

1. A roof truss forming machine for assembling and nailing with nail plates timbers into a planar roof truss comprising, a stationary elongated rail, a plurality of brides extending laterally from said rail and movably supported at one end on said rail so as to be adjustably positioned along said rail, a carriage at the free other end of each bridge for movably supporting said free other end of the bridge, at least one base movably supported on each bridge so as to be adjustably positioned along the bridges extending laterally from said rail and movably supported on each base so as to be rotatably adjustably positioned with respect to the base, said stands having support means supporting the timbers to be nailed, a cradle movably supported on each stand and movable toward and away from the timbers supported by the stand, and a hydraulically operated C-clamp supported by each cradle for pressing the nail plates into the timbers supported by the stands when the cradle is moved toward the timbers.

2. A roof truss forming machine as defined in claim 1 wherein said stationary elongated rail comprises an elongated round rod secured to an inverted T-bar, and said one end of each of said bridges has a pair of split anti-friction bushings movable along said rod.

3. A roof truss forming machine as defined in claim 2 wherein said one end of each of said bridges is provided with at least one pressure screw for engaging the T-bar to secure the bridge in adjusted position along said rail.

4. A roof truss forming machine as defined in claim 1 wherein the carriage at the free other end of each bridge has a pair of wheels for movably supporting said other end of the bridge on the floor.

5. A roof truss forming machine as defined in claim 4 wherein said carriage is provided with a plurality of pressure screws for engaging the floor to lift the wheels from the floor and secure the bridge in adjusted position.

6. A roof truss forming machine as defined in claim 1 wherein each bridge has a pair of rails extending lengthwise thereof, and each base has a plurality of rollers rollable on said rails for movably supporting the base on the bridge.

7. A roof truss forming machine as defined in claim 6 wherein each base has a pair of members underlying the pair of rails of the bridge, and each base is provided with a plurality of pressure screws for engaging the rails to lift the rollers from the rails and to clamp the pair of members to the underside of the rail for securing the base in adjusted position on the bridge.

8. A roof truss forming machine as defined in claim 1 wherein each base has an upper planar surface, each stand has a lower circular flanged planar surface supported on the upper planar surface of the base, and a central pivotal connection is provided between the base and the stand for rotatably mounting the stand on the base.

9. A roof truss forming machine as defined in claim 8 wherein the base has a plurality of hold down blocks engaging the flange of the circular planar surface of the stand for securing the stand in angularly adjusted position on the base.

10. A roof truss forming machine as defined in claim 1 wherein each stand has a pair of parallel rods, and each cradle has a plurality of split anti-friction bushings movable along said rods to support the cradle on the stand for movement toward and away from the timbers supported by the stand.

11. A roof truss forming machine as defined in claim 1 wherein each hydraulically operated C-clamp includes a piston and a cylinder, a platen secured to the piston and vertically movably guided by the cradle and normally resting by gravity on the cradle below the plane of the timbers supported by the stand, and a C-clamp member secured to the cylinder below the platen and having a pressure plate above the plane of the timbers supported by the stand, the arrangement being such that when the cradle is moved toward the timbers supported by the support means of the stand with the platen and pressure plate of the hydraulically operated C-clamp in vertical alignment with the timbers where they are to be nailed, the application of hydraulic pressure to the cylinder and piston causes the platen to rise and the pressure plate to lower for simultaneously pressing nail plates into opposite sides of the timbers.

[12. In a roof truss forming machine for assembling and nailing with nail plates timbers into a planar roof truss, the improvement comprising, a stand having support means for supporting the timbers in position where they are to be nailed, a cradle movably supported on the stand and laterally movable toward and away from the timbers supported by the support means of the stand, and a hydraulically operated C-clamp including a piston and a cylinder, a platen secured to the piston and vertically movably guided by the cradle and normally resting by gravity on the cradle below the plane of the timbers supported by the stand, and a C-clamp member secured to the cylinder below the platen and having a pressure plate above the plane of the timbers supported by the stand, the arrangement being such that when the cradle is moved toward the timbers supported by the support means of the stand with the platen and pressure plate of the hydraulically operated C-clamp in vertical alignment with the timbers where they are to be nailed, the application of hydraulic pressure to the cylinder and piston causes the platen to rise and the pressure plate to lower for simultaneously pressing nail plates into opposite sides of the timbers.]

13. In a roof truss forming machine for assembling and nailing with nail plates timbers into a planar roof truss, the improvement comprising, a laterally adjustably positionable base, a stand rotatably supported on the base so as to be rotatably adjustably positioned with respect to the base through substantially 360 angular degrees, said stand having support means for supporting the timbers to be nailed, a cradle movably supported on the stand and movable toward and away from the timbers supported by the stand, and a hydraulically operated C-clamp supported by the cradle for pressing the nail plates into the timbers supported by the stand when the cradle is moved toward the timbers.

14. A roof truss forming machine as defined in claim 13 wherein said hydraulically operated C-clamp includes a piston and a cylinder, a platen secured to the piston and vertically guided by the cradle and normally resting by gravity on the cradle below the plane of the timbers supported by the stand, and a C-clamp member secured to the cylinder below the platen and having a pressure plate above the plane of the timbers supported by the stand, the arrangement being such that when the cradle is moved toward the timbers supported by the support means of the stand with the platen and pressure plate of the hydraulically operated C-clamp in vertical alignment with the timbers where they are to be nailed, the application of hydraulic pressure to the cylinder and piston causes the platen to rise and the pressure plate to lower for simultaneously pressing nail plates into opposite sides of the timbers.

*15. In a roof truss forming machine for assemblying and nailing timbers on opposite sides with nail plates into a planar roof truss, the improvement comprising, a stand having support means for supporting the timbers in position where they are to be nailed, a cradle movably supported on the stand and laterally movable toward and away from the timbers supported by the support means of the stand, and a hydraulically operated C-clamp including a piston and a cylinder, a platen secured to the piston and vertically movable guided by the cradle and normally resting by gravity on the cradle below the plane of the timbers supported by the stand, and an unsuspended freely movable C-clamp member secured to the cylinder below the platen and having a pressure plate above the plane of the timbers supported by the stand, the arrangement being such that the entire weight of the hydraulically operated C-clamp is supported by the cradle through the platen when the platen is resting by gravity on the cradle and being such that, when the cradle is moved toward the timbers supported by the support means of the stand with the platen and pressure plate of the hydraulic ally operated C-clamp in vertical alignment with the timbers where they are to be nailed, the application of hydraulic pressure to the cylinder and piston causes the pressure plate to first lower and engage the nail plate above the timbers so that the entire weight of the hydraulically operated C-clamp is supported by the timbers and then the platen to rise and engage the nail plate below the timbers with the timbers for thereafter simultaneously pressing the nail plates into opposite sides of the timbers.*

References Cited

The following references, cited by the Examiner, are of record in the patented file of this patent or the original patent.

UNITED STATES PATENTS

| | | | |
|---|---|---|---|
| 3,100,301 | 8/1963 | Black | 227—152 X |
| 3,207,406 | 9/1965 | Bowman | 227—152 |
| 3,358,589 | 12/1967 | Hentzschel | 100—100 |
| 3,379,354 | 4/1968 | Moehlenpah et al. | 227—152 |
| 3,388,657 | 6/1968 | Jureit | 100—208 |

BILLY J. WILHITE, Primary Examiner

U.S. Cl. X.R.

100—193, 231, 269 R; 227—152